(12) United States Patent
Zhang et al.

(10) Patent No.: US 8,717,460 B2
(45) Date of Patent: May 6, 2014

(54) METHODS AND SYSTEMS FOR AUTOMATIC WHITE BALANCE

(75) Inventors: Buyue Zhang, Plano, TX (US); Aziz Umit Batur, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 503 days.

(21) Appl. No.: 12/700,671

(22) Filed: Feb. 4, 2010

(65) Prior Publication Data

US 2010/0194918 A1   Aug. 5, 2010

Related U.S. Application Data

(60) Provisional application No. 61/149,937, filed on Feb. 4, 2009, provisional application No. 61/084,094, filed on Jul. 28, 2009.

(51) Int. Cl.
*H04N 9/73* (2006.01)

(52) U.S. Cl.
USPC ..................................... 348/223.1; 348/222.1

(58) Field of Classification Search
USPC .......................................... 348/222.1, 223.1
See application file for complete search history.

(56) References Cited

U.S. PATENT DOCUMENTS

2003/0052978 A1*   3/2003   Kehtarnavaz et al. ..... 348/223.1
2007/0064119 A1*   3/2007   Komiya et al. ............ 348/222.1

OTHER PUBLICATIONS

U.S. Appl. No. 12/510,853, filed Jul. 28, 2009, "Method and Apparatus for White Balance", Buyue Zhang and Aziz Umit Batur, pp. 1-27.

* cited by examiner

*Primary Examiner* — Usman Khan
(74) *Attorney, Agent, or Firm* — Mirna Abyad; W. James Brady; Frederick J. Telecky, Jr.

(57) ABSTRACT

A method for calibrating automatic white balance (AWB) is provided that includes using a plurality of references for AWB that include color temperature references, wherein an AWB failure is detected in an image, generating a scene prototype reference based on the image, and adding the generated scene prototype reference to the references for AWB. A method for calibrating AWB is provided that includes selecting an image as a scene prototype, wherein the selected image was captured by a second imaging sensor different from a first imaging sensor, transforming the selected image into a scene prototype image for the first imaging sensor, generating a scene prototype reference using the scene prototype image for the first imaging sensor, and adding the generated scene prototype reference to references for AWB that include color temperature references.

5 Claims, 10 Drawing Sheets

METHODS AND SYSTEMS FOR AUTOMATIC WHITE BALANCE

CROSS-REFERENCE TO RELATED APPLICATIONS

This application claims benefit of U.S. Provisional Patent Application Ser. No. 61/149,937, filed Feb. 4, 2009 and U.S. Provisional Patent Application Ser. No. 61/084,094, filed Jul. 28, 2009, which are incorporated herein by reference in their entirety. This application is related to U.S. patent application Ser. No. 12/510,853, filed Jul. 28, 2009, which is incorporated by reference herein in its entirety.

BACKGROUND OF THE INVENTION

White balance is the process of removing unrealistic color cast from a digital image caused by the color of the illumination. Human eyes automatically adapt to the color of the illumination, such that white will always appear white. Unfortunately, image capture devices (e.g., camera sensors) cannot adapt automatically. Therefore, white balance techniques are needed for imaging sensors in image capture systems (e.g., a digital camera) to compensate for the effect of illumination.

Automatic white balance (AWB) is an essential part of the imaging system pipeline in image capture systems. Digital still cameras and camera phones, for example, apply AWB techniques to correctly display the color of digital images. The quality of AWB has been a differentiating factor for different camera brands.

Typical scenes in photographs and videos may include expanses of sky, trees, grass, sand, sea, and/or people. Such scenes may have large areas of dominant object color: blue, green, yellow, etc. The unique combination of these colors may occur in specific scenes, for instance, blue+yellow→beach scene (sky, sea, and sand); blue+green→outdoor landscape (sky, tree, and grass), etc. Such scenes may be difficult to render in many image capture systems because commonly used white balance techniques may mistake a dominant object color for color cast from the illuminant, and hence try to neutralize the object color to reduce color cast. This leads to inaccurate color in the image or creation of false color cast in the image. Accordingly, improvements in automatic white balance in order to improve the quality of digital images captured by image capture systems are desirable.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
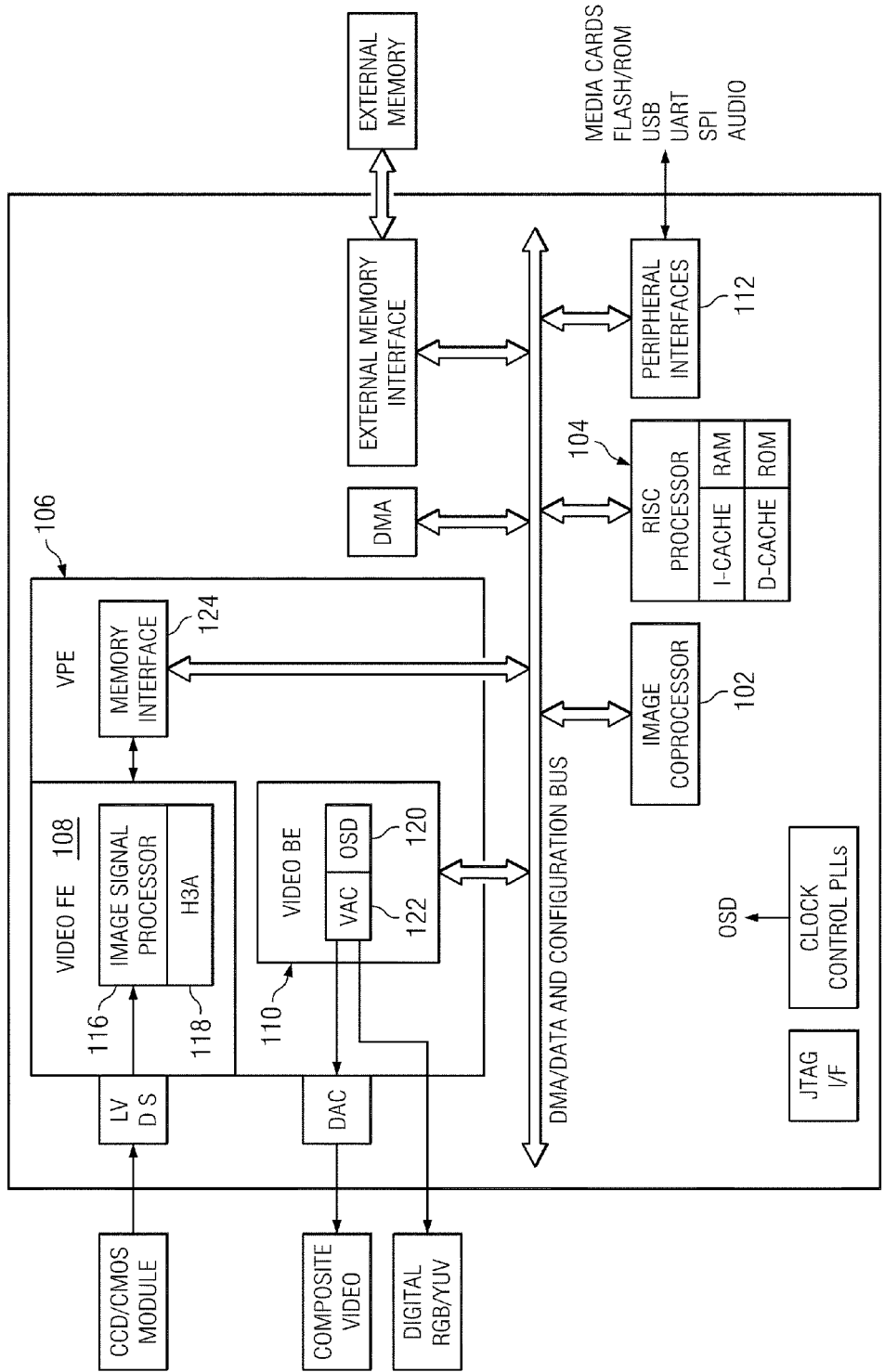
FIG. 1 shows a block diagram of a digital system in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" and derivatives thereof are intended to mean an indirect, direct, optical, and/or wireless connection. Thus, if a first device or component couples to a second device or component, that connection may be through a direct connection, through an indirect connection via other devices and connections, through an optical connection, and/or through a wireless connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, combined, and/or performed in a different order than the order shown in the figures and/or described herein. Accordingly, embodiments of the invention should not be considered limited to the specific ordering of steps shown in the figures and/or described herein.

In general, embodiments of the invention provide methods and systems for automatic white balance in digital systems that capture digital images. A digital image is a block of pixels such as single photograph, a subset of a photograph, a frame (or other subset) of a digital video sequence, etc. In one or more embodiments of the invention, a digital system that is configured to capture photographs and/or video sequences implements an automatic white balance (AWB) method that is calibrated with references generated by an embodiment of an AWB calibration method. The references may include references generated using a test target (e.g., a color checker), i.e., color temperature references, and references generated using scene prototypes, i.e., scene prototype references. A reference may include statistics (e.g., a histogram) of an image used to generate the reference and/or one or more gray values (e.g., R, G, B, Cb, Cr values extracted from gray areas in an image).

In some embodiments of the invention, the AWB method is an embodiment of the method described in U.S. patent application Ser. No. 12/510,853. In general, embodiments of the AWB method compare a histogram of an image to reference histograms using histogram correlation to determine which reference best matches the image, i.e., has the closest color temperature, and then use the gray values of the selected reference to perform white balance correction on the image. U.S. patent application Ser. No. 12/510,853 provides more detailed descriptions of method embodiments.

FIG. 1 shows a digital system suitable for an embedded system (e.g., a digital camera) in accordance with one or more embodiments of the invention that includes, among other components, a DSP-based image coprocessor (ICP) (102), a RISC processor (104), and a video processing engine (VPE) (106) that may be configured to perform an AWB method as described herein. The RISC processor (104) may be any suitably configured RISC processor. The VPE (106) includes a configurable video processing front-end (Video FE) (108) input interface used for video capture from imaging peripherals such as imaging sensors, video decoders, etc., a configurable video processing back-end (Video BE) (110) output interface used for display devices such as SDTV displays, digital LCD panels, HDTV video encoders, etc, and memory interface (124) shared by the Video FE (108) and the Video BE (110). The digital system also includes peripheral interfaces (112) for various peripherals that may include a multimedia card, an audio serial port, a Universal Serial Bus (USB) controller, a serial port interface, etc.

The Video FE (108) includes an image signal processor (ISP) (116), and an H3A statistic generator (H3A) (118). The ISP (116) provides an interface to imaging sensors and digital video sources. More specifically, the ISP (116) may accept raw image/video data from a sensor module (126) (e.g., CMOS or CCD) and can accept YUV video data in numerous formats. The ISP (116) also includes a parameterized image processing module with functionality to generate image data in a color format (e.g., RGB) from raw CCD/CMOS data. The ISP (116) is customizable for each sensor type and supports video frame rates for preview displays of captured digital images and for video recording modes. The ISP (116) also includes, among other functionality, an image resizer, statistics collection functionality, and a boundary signal calculator. The H3A module (118) includes functionality to support control loops for auto focus, auto white balance, and auto exposure by collecting metrics on the raw image data from the ISP (116) or external memory. In one or more embodiments of the invention, the Video FE (108) is configured to perform one or more AWB methods as described herein.

The Video BE (110) includes an on-screen display engine (OSD) (120) and a video analog encoder (VAC) (122). The OSD engine (120) includes functionality to manage display data in various formats for several different types of hardware display windows and it also handles gathering and blending of video data and display/bitmap data into a single display window before providing the data to the VAC (122) in a color space format (e.g., RGB, YUV, YCbCr). The VAC (122) includes functionality to take the display frame from the OSD engine (120) and format it into the desired output format and output signals required to interface to display devices. The VAC (122) may interface to composite NTSC/PAL video devices, S-Video devices, digital LCD devices, high-definition video encoders, DVI/HDMI devices, etc.

The memory interface (124) functions as the primary source and sink to modules in the Video FE (108) and the Video BE (110) that are requesting and/or transferring data to/from external memory. The memory interface (124) includes read and write buffers and arbitration logic.

The ICP (102) includes functionality to perform the computational operations required for compression and other processing of captured images. The video compression standards supported may include, for example, one or more of the JPEG standards, the MPEG standards, and the H.26x standards. In one or more embodiments of the invention, the ICP (102) may be configured to perform computational operations of methods for automatic white balance as described herein.

In operation, to capture a photograph or video sequence, video signals are received by the video FE (108) and converted to the input format needed to perform video compression. Prior to the compression, one or more methods for automatic white balance as described herein may be applied as part of processing the captured video data. The video data generated by the video FE (108) is stored in the external memory. The video data is then encoded, i.e., compressed. During the compression process, the video data is read from the external memory and the compression computations on this video data are performed by the ICP (102). The resulting compressed video data is stored in the external memory. The compressed video data is then read from the external memory, decoded, and post-processed by the video BE (110) to display the image/video sequence.

Figure 2:
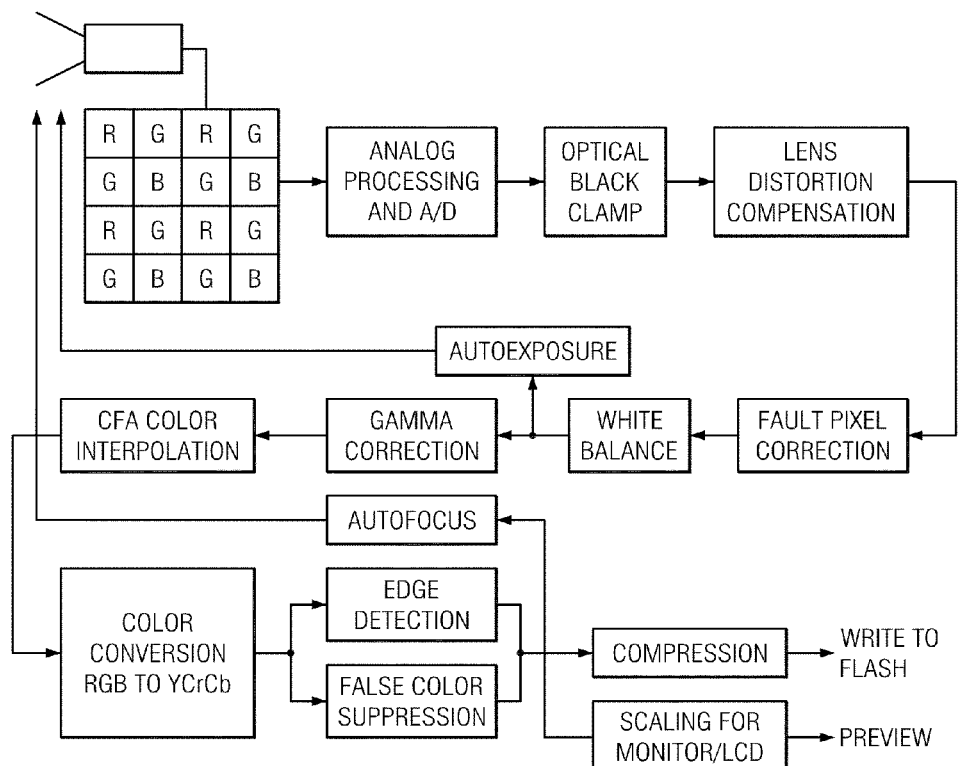
FIG. 2 shows a block diagram of an image processing pipeline in accordance with one or more embodiments of the invention.

FIG. 2 is a block diagram illustrating digital camera control and image processing (the "image pipeline") in accordance with one or more embodiments of the invention. One of ordinary skill in the art will understand that similar functionality may also be present in other digital systems (e.g., a cell phone, PDA, a desktop or laptop computer, etc.) capable of capturing digital photographs and/or digital video sequences. The automatic focus, automatic exposure, and automatic white balancing are referred to as the 3A functions; and the image processing includes functions such as color filter array (CFA) interpolation, gamma correction, white balancing, color space conversion, and compression/decompression (e.g., JPEG for single photographs and MPEG for video sequences). A brief description of the function of each block in accordance with one or more embodiments is provided below. Note that the typical color imaging sensor (e.g., CMOS or CCD) includes a rectangular array of photosites (i.e., pixels) with each photosite covered by a filter (the CFA): typically, red, green, or blue. In the commonly-used Bayer pattern CFA, one-half of the photosites are green, one-quarter are red, and one-quarter are blue.

To optimize the dynamic range of the pixel values represented by the imager of the digital camera, the pixels representing black need to be corrected since the imager still records some non-zero current at these pixel locations. The black clamp function adjusts for this difference by subtracting an offset from each pixel value, but clamping/clipping to zero to avoid a negative result.

Imperfections in the digital camera lens introduce nonlinearities in the brightness of the image. These nonlinearities reduce the brightness from the center of the image to the border of the image. The lens distortion compensation function compensates for the lens by adjusting the brightness of each pixel depending on its spatial location.

Photosite arrays having large numbers of pixels may have defective pixels. The fault pixel correction function interpolates the missing pixels with an interpolation scheme to provide the rest of the image processing data values at each pixel location.

The illumination during the recording of a scene is different from the illumination when viewing a picture. This results in a different color appearance that may be seen as the bluish appearance of a face or the reddish appearance of the sky. Also, the sensitivity of each color channel varies such that grey or neutral colors may not be represented correctly. In one or more embodiments of the invention, the white balance function compensates for these imbalances in colors in accordance with a method for automatic white balance as described herein.

Due to the nature of a color filter array, at any given pixel location, there is information regarding one color (R, G, or B in the case of a Bayer pattern). However, the image pipeline needs full color resolution (R, G, and B) at each pixel in the image. The CFA color interpolation function reconstructs the two missing pixel colors by interpolating the neighboring pixels.

Display devices used for image-viewing and printers used for image hardcopy have a nonlinear mapping between the image gray value and the actual displayed pixel intensities. The gamma correction function (also referred to as adaptive gamma correction, tone correction, tone adjustment, contrast/brightness correction, etc.) compensates for the differences between the images generated by the imaging sensor and the image displayed on a monitor or printed into a page.

Typical image-compression algorithms such as JPEG operate on the YCbCr color space. The color space conversion function transforms the image from an RGB color space to a YCbCr color space. This conversion may be a linear transformation of each Y, Cb, and Cr value as a weighted sum of the R, G, and B values at that pixel location.

The nature of CFA interpolation filters introduces a low-pass filter that smoothes the edges in the image. To sharpen the images, the edge detection function computes the edge magnitude in the Y channel at each pixel. The edge magnitude is then scaled and added to the original luminance (Y) image to enhance the sharpness of the image.

Edge enhancement is performed in the Y channel of the image. This leads to misalignment in the color channels at the edges, resulting in rainbow-like artifacts. The false color suppression function suppresses the color components, Cb and Cr, at the edges reduces these artifacts.

The autofocus function automatically adjusts the lens focus in a digital camera through image processing. These autofocus mechanisms operate in a feedback loop. They perform image processing to detect the quality of lens focus and move the lens motor iteratively until the image comes sharply into focus.

Due to varying scene brightness, to get a good overall image quality, it is necessary to control the exposure of the imaging sensor. The autoexposure function senses the average scene brightness and appropriately adjusting the imaging sensor exposure time and/or gain. Similar to autofocus, this operation is also in a closed-loop feedback fashion.

Most digital cameras are limited in the amount of memory available on the camera; hence, the image compression function is employed to reduce the memory requirements of captured images and to reduce transfer time.

Figure 3:
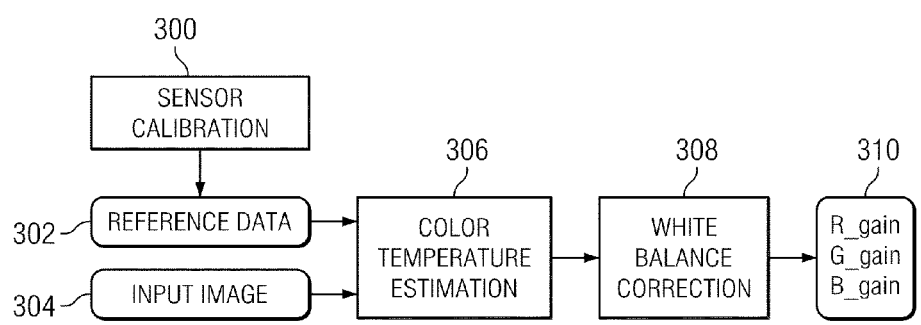
FIG. 3 shows a block diagram of automatic white balance flow in accordance with one or more embodiments of the invention.

FIG. 3 is a block diagram of AWB flow in accordance with one or more embodiments of the invention. Initially, sensor calibration is performed (300) to produce reference data (302) for calibration of an embodiment of an AWB method. The sensor calibration may be performed in accordance with an embodiment of a method for AWB calibration as described herein. As is described in more detail below, in one or more embodiments of the invention, the sensor calibration is performed using an AWB simulation system and an AWB calibration system and the resulting reference data (302) is integrated into a digital system (e.g., the digital systems of FIGS. 1, 10, and 11) implementing an embodiment of an AWB method as described herein. In some embodiments of the invention, the reference data (302) may include both references generated using test target (e.g., a color checker) and references generated using scene prototypes. Generation of references using a test target is explained in more detail below in reference to FIG. 6A and generation of references using scene prototypes is explained in more detail in reference to FIGS. 5, 6B, and 8.

The reference data (302) is then used to perform automatic white balancing on an input image (304). The automatic white balancing includes performing color temperature estimation (306) and white balance correction (308) using the reference data (302) and the input image (304). Suitable methods for color temperature estimation and white balance correction are described in U.S. patent application Ser. No. 12/510,853. The outputs of the color temperature estimation (306) and white balance correction (308) include the gains (R_gain, G_gain, B_gain) to be applied to the color channels of the image (304) to generate a white balanced image.

Figure 4A:
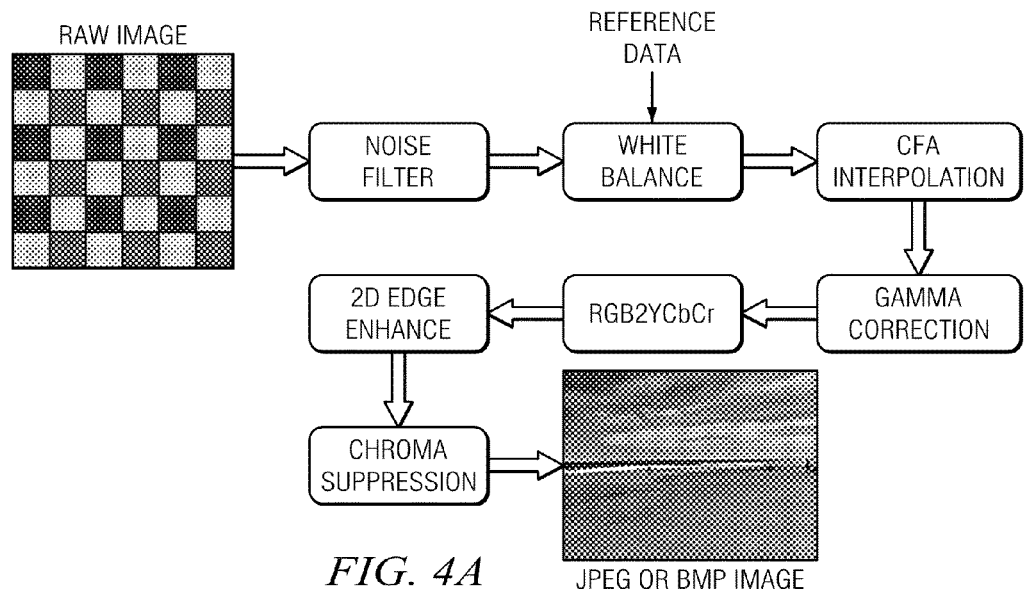
FIGS. 4A and 4B show block diagrams of a simulation system in accordance with one or more embodiments of the invention.
Figure 4B:
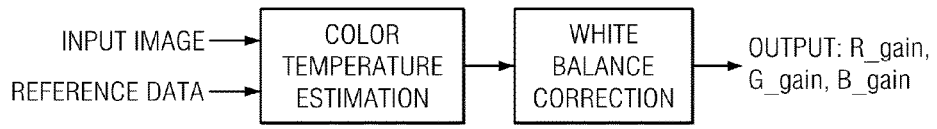

FIGS. 4A and 4B show block diagrams of a simulation system in accordance with one or more embodiments of the invention. In general, the simulation system simulates image pipeline processing. In some embodiments of the invention, the components of the simulation system shown in FIG. 4A simulate the functionality of image pipeline processing components in a target digital system (e.g., the digital systems of FIGS. 1, 10, and 11) to support tuning, testing, calibration, etc. of the various components using one or more test suites of digital images. In one or more embodiments of the invention, the components of the simulation system of FIG. 4A simulate functionality of similarly named components in the image pipeline of FIG. 2.

Further, in some embodiments of the invention, as shown in FIG. 4B, the white balance component of FIG. 4A simulates an automatic white balance method that includes color temperature estimation and white balance correction using reference data and the input image. Suitable methods for color temperature estimation and white balance correction are described in U.S. patent application Ser. No. 12/510,853. The outputs of the color temperature estimation and white balance correction include the gains (R_gain, G_gain, B_gain) to be applied to the color channels of the image to generate a white balanced image.

Figure 4C:
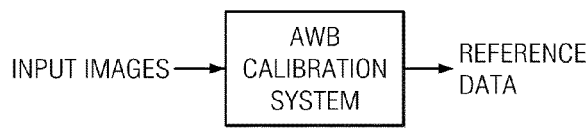
FIG. 4C shows a block diagram of an automatic white balance calibration system in accordance with one or more embodiments of the invention.

FIG. 4C is a block diagram of an AWB calibration system in accordance with one or more embodiments of the invention. In general, the AWB calibration system accepts input images of a test target captured with an imaging sensor and input images of scene prototypes captured with the imaging sensor and uses those images to generate reference data for calibrating AWB in a digital system having the type of imaging sensor used to capture the images. The reference data may include color temperature reference data generated from the test target images and/or scene prototype reference data generated from the scene prototype images. The reference data may include image statistics for each input image and/or gray values for each input image. In some embodiments of the invention, the image statistics are histograms. Generation of references using a test target is explained in more detail below in reference to FIG. 6A and generation of references using scene prototypes is explained in more detail in reference to FIGS. 5 and 6B. In one or more embodiments of the invention, the AWB calibration system includes functionality to use a scene prototype image captured with one imaging sensor to generate scene prototype reference data for a different imaging sensor. A method for this latter functionality is described in more detail below in reference to FIG. 8.

Figure 5:
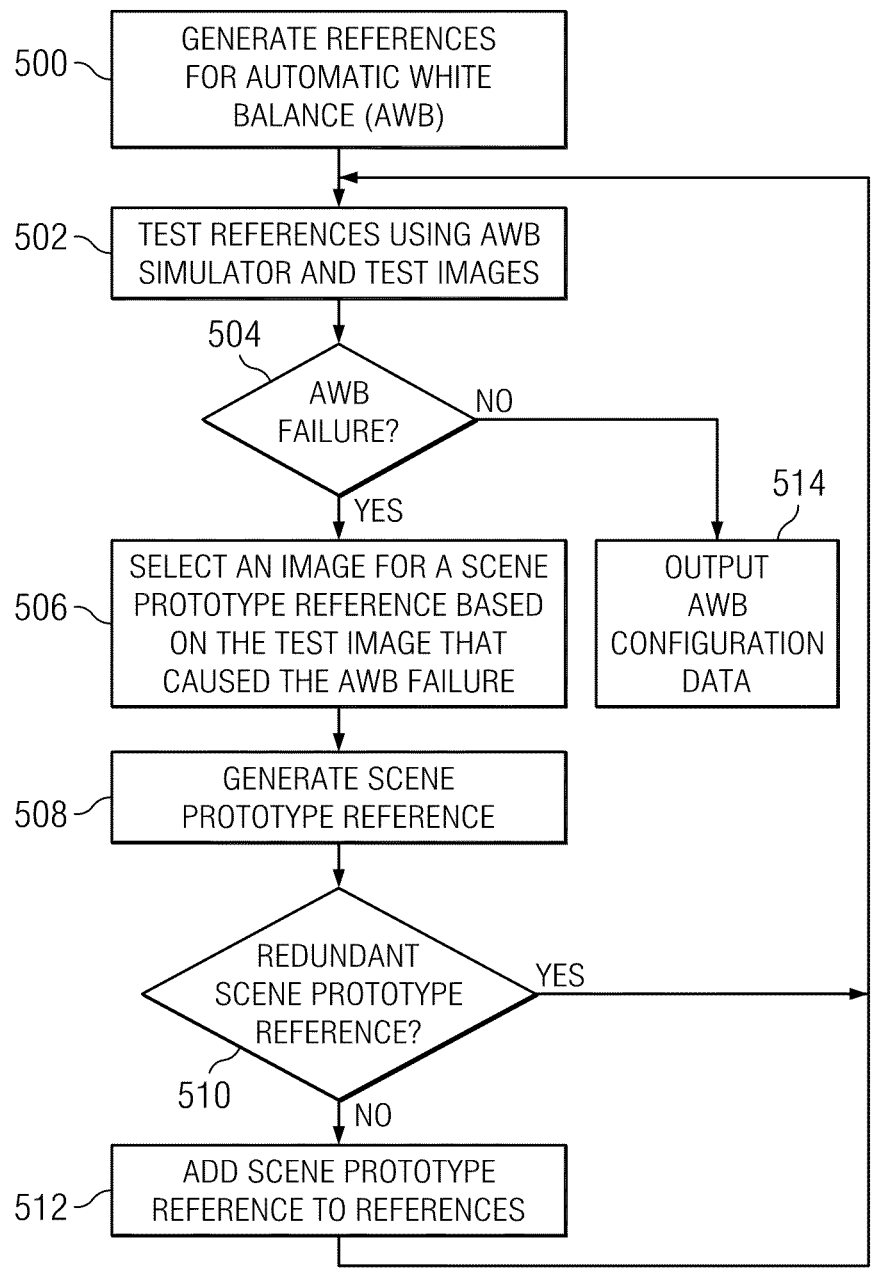
FIGS. 5, 6A, 6B, 8, and 9 show flow graphs of methods for automatic white balance calibration in accordance with one or more embodiments of the invention.

FIG. 5 is a flow graph of a method for calibration of automatic white balancing (AWB) in a digital system in accordance with one or more embodiments of the invention. In general, calibration of AWB is the generation of reference statistics (e.g., histograms) and/or gray values for a target imaging sensor. As shown in FIG. 5, initially references are generated for calibration of AWB in the digital system (500). These initial references may be histograms and one or more gray values derived from images of a test target containing gray patches, such as a color checker, taken under a variety of color temperatures using the same type of imaging sensor as is included in the digital system. The color checker may be any suitable color checker such as, for example, X-Rite ColorChecker Classic or an X-Rite ColorChecker Digital SG.

Figure 6A:
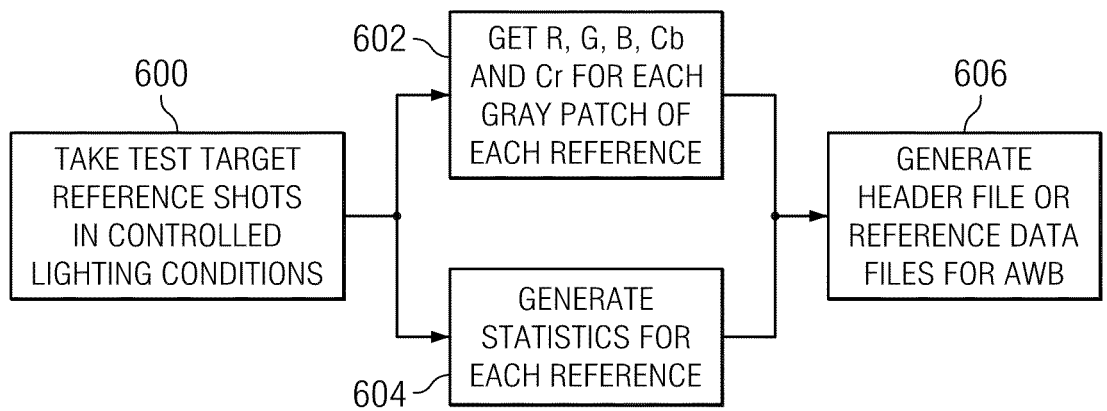

In one or more embodiments of the invention, the initial references are generated in accordance with the method of FIG. 6A. As shown in FIG. 6A, initially digital images of the test target (e.g., a color checker) are captured with the imaging sensor in a light box under controlled lighting conditions to capture images of the test target with different color temperatures (600). The color temperatures may include, for example, one or more of A (2800K), U30 (3000K), CWF (4200K), TL84 (4000K), D50 (5000K), D65 (6500K), and D75 (7500K).

Then, statistics are generated for each of the test target images (604). In one or more embodiments of the invention, 2-D histograms of the test target images in the Cb-Cr space are computed. The histograms may be computed by quantizing the Cb into N (e.g., N=35) bins and Cr into M (e.g., M=32) bins, and counting the number of blocks or pixels falling into each Cr and Cb bin. In some embodiments of the invention, the images are downsampled before the histograms are generated.

In addition, the R, G, B, Cb and Cr values of one or more gray levels are extracted from gray patches in each of the test target images (602). The number of gray patches from which gray values are extracted may vary. For example, if the test target is a classic Macbeth color checker, there are six gray patches of different gray color levels available. In one or more embodiments of the invention, the gray patches corresponding to the middle four gray levels are used, i.e., gray values are extracted from these four gray patches. The white patch is not used because of saturation issues and the black patch is not used because of large quantization errors.

In some embodiments of the invention, the R, G, B values for a gray patch are computed as the averages of the R, G, B values of pixels in the gray patch. In some embodiments of the invention, only a selected subset of the pixels (e.g., a center block of pixels in the gray patch) is used to compute the R, G, B values of the gray patch. Further, the Cb and Cr values for a gray patch are computed based on the R, G, B values. The Cb and Cr values may be computed as $$Y = 0.299R + 0.587G + 0.114B$$

$$Cb = 256(-0.1726R - 0.3388G + 0.5114B)/Y$$

$$Cr = 256(0.5114R - 0.4283G - 0.0832B)/Y$$

The scale factors used in the above equations may be known industry standard scale factors for converting from R, G, B to Cb and Cr or may be empirically derived scale factors. In the above equations, Cb and Cr are normalized by Y. In other embodiments of the invention, Cb and Cr may be computed as shown above without normalization by Y.

The statistics and gray values for the images are then included in the set of reference data for AWB in the digital system (606).

Referring again to FIG. 5, once the initial references, i.e., the color temperature references, are generated, the references are tested using an AWB simulator and test images (502). If there is an AWB failure on a test image (504), the initial references may be augmented with a scene prototype reference to handle the failure. An AWB failure may be determined, for example, when the image after application of AWB has an obviously unrealistic or undesirable color cast.

Figure 7:
FIG. 7 shows example images for scene prototypes in accordance with one or more embodiments of the invention.

When there is an AWB failure, an image is selected as a scene prototype based on the test image that caused the failure (506). The selected image (i.e., the scene prototype image) may be the test image or may be another image that is representative of a class of images that resemble the test image. Further, the selected image is an image captured by the same type of imaging sensor as the one used to capture the color checker images used to generate the initial references. FIG. 7 shows two examples of images that may be used for scene prototypes. The upper image shows a beach scene with large expanses of sky, sea, and sand. The lower image shows a landscape scene with large expanses of grass and sky. Other examples of images for scene prototypes include lowlight indoors with people (people in a bar, restaurant) and outdoor lake/river scenes.

A scene prototype reference is then generated using the selected image (508). Similar to the initial references, a scene prototype reference includes statistics (e.g., a histogram) of the selected image and/or one or more gray values. In some embodiments of the invention, the one or more gray values are the gray values of a reference in the initial references that provides the best white balance correction of the selected image.

Figure 6B:
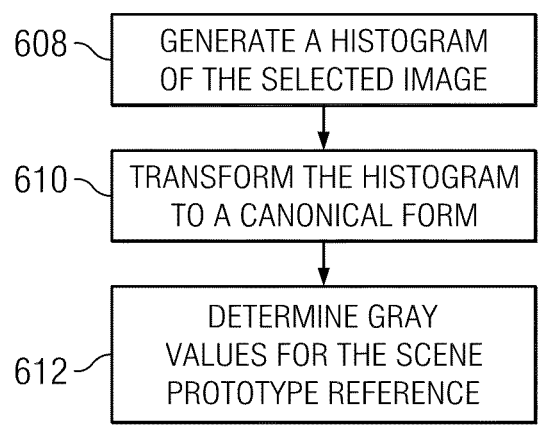

In one or more embodiments of the invention, the scene prototype reference is generated in accordance with the method of FIG. 6B. As shown in FIG. 6B, initially a histogram of the selected image is generated (608). While this method describes generating a histogram, one of ordinary skill in the art will understand that other statistics may be generated. In some embodiments of the invention, the histogram is generated in the same manner as the color temperature references. In one or more embodiments of the invention, the histogram is computed by quantizing the Cb into N (e.g., N=35) bins and Cr into M (e.g., M=32) bins, and counting the number of blocks or pixels falling into each Cr and Cb bin. In some embodiments of the invention, the selected image is downsampled before the histogram is generated.

In one or more embodiments of the invention, the histogram is then transformed into a canonical form that represents a class of images with similar scenes (610). For example, a thresholding operation may be applied to the histogram. Optionally, the histogram may also be normalized after the thresholding operation. Pseudo code of an example thresholding operation and an example normalization operation is shown in Table 1. In this pseudo code, C is a scalar that guarantees that the sum of the histogram is equal to C. In some embodiments of the invention, the value of hist_Thresh is 10% and the value of C is the total number of pixels in the image from which the histogram is generated. In some embodiments of the invention, the value of hist_Thresh is determined empirically.

TABLE 1 hist_img_Percent=hist_CbCr/(sum(sum(hist_CbCr)))*100;
hist_img_transform=hist_Thresh*(hist_img_Percent>hist_Thresh)+
    hist_img_Percent.*(hist_img_Percent<=hist_Thresh);
hist_img_norm=hist_img_transform/(sum(sum(hist_img_transform))*C;

The gray values for the scene prototype reference are then determined (612). In some embodiments of the invention, the gray values are determined by finding the color temperature reference that provides the best white balance correction of the selected image and using the gray values for that color temperature reference as the gray values for the scene prototype reference. The best color temperature reference may be found, for example, by using each of the color temperature references to white balance the image (e.g., using an AWB simulator) and visually observing which of the color temperature references yields the best color. The best color temperature reference may also be found by running standard white balance tests on the resultant image to determine which reference yields the smallest white balance errors. In some embodiments of the invention, the gray values are determined by including a color checker in the scene when the scene prototype image is captured. The gray values for the scene prototype reference may then be extracted from the gray patches in the color checker.

Referring again to FIG. 5, after the scene prototype reference is generated, a check is made to determine if the scene prototype reference is redundant, i.e., that a scene prototype reference already in the references is too similar to the generated scene prototype reference (510). If the generated scene prototype reference is determined to be redundant, it is not added to the references. Otherwise, the generated scene prototype reference is added to the references (512). Testing and generation of scene prototypes (502-512) continues until no AWB failures are found (504). When no AWB failure is detected, the references are output as AWB configuration data for AWB in the digital system (514).

In some embodiments of the invention, the redundancy determination (510) is based on correlation scores of the histogram of the generated scene prototype reference and the histograms of the existing scene prototype references. The correlation score between two histograms may be computed as $$Corr = \frac{\sum_m \sum_n \text{Hist\_1}(m,n) \cdot \text{Hist\_2}(m,n)}{\text{StdDev\_1} \cdot \text{StdDev\_2}}, \quad (1)$$

where $$\text{StdDev\_i} = \sqrt{\frac{1}{M \cdot N} \sum_{n=1}^{N} \sum_{m=1}^{M} \text{Hist\_i}(m,n)^2}, \quad i=1,2 \quad (2)$$

If the correlation score between the histogram of the generated scene prototype reference and a histogram of an existing scene prototype reference exceeds a correlation threshold, e.g., 0.3, the generated scene prototype reference is determined to be redundant. Note that the higher the correlation score, the more correlated the two histograms are, indicating greater similarity between the two scene prototype references and the lower the correlation score, the less correlated the two histograms are, indicating lesser similarity between the two scene prototype references.

Figure 8:
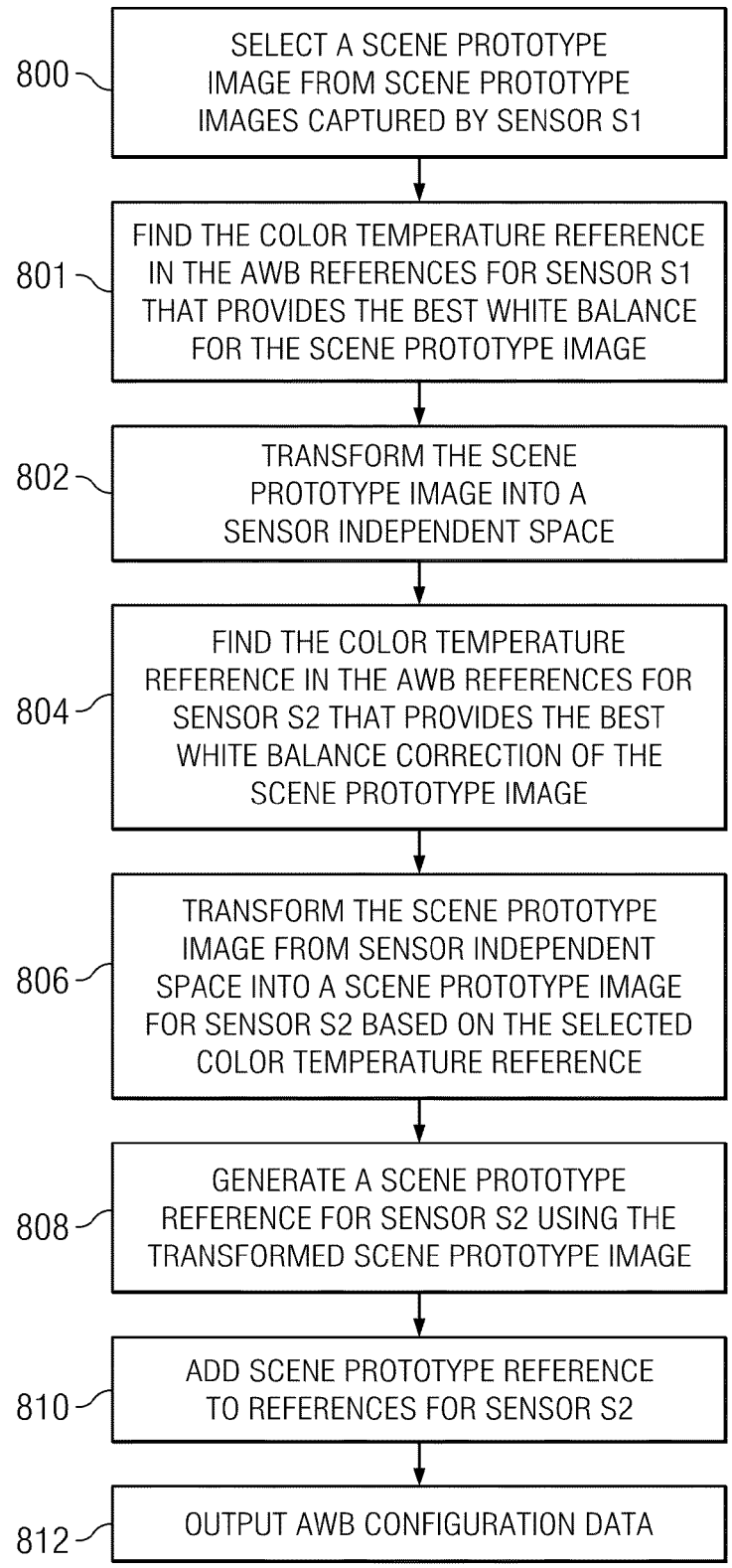

FIG. 8 is a flow graph of a method for calibration of automatic white balancing (AWB) in a digital system in accordance with one or more embodiments of the invention. In general, embodiments of the method provide for transforming scene prototype images captured by one imaging sensor S1 for use in generating scene prototype references for AWB with a different imaging sensor S2. As shown in FIG. 8, a scene prototype image is selected from scene prototype images captured by sensor S1 (800).

The color temperature reference in the AWB references for sensor S1 that provides the best white balance for the scene prototype image is then found (801). The best color temperature reference may be found, for example, by using each of the color temperature references to white balance the scene prototype image (e.g., using an AWB simulator) and visually observing which of the color temperature references yields the best color.

The selected scene prototype image is then made sensor independent (802). In one or more embodiments of the invention, the scene prototype reference is made sensor independent by changing the R, G, and B values of the pixels in the scene prototype image based on the white balance gains R_gain, G_gain, and B_gain computed for the best color temperature reference found in the previous step. The R, G, and B values for the pixels of the sensor independent scene prototype image, denoted as Z, may be computed as $$Rz = Rx * R\_gain$$

$$Gz = Gx * G\_gain$$

$$Bz = Bx * B\_gain$$

where Rx, Gx, Bx are the R, G, B values of the pixels of the S1 scene prototype image and Rz, Gz, and Bz are the R, G, B values of the pixels of sensor independent scene prototype image.

Next, a color temperature reference in the color temperature references for imaging sensor S2 that provides the best white balance correction of the S1 scene prototype image is found (804). In some embodiments of the invention, the color temperature reference in the S2 color temperature references that has a color temperature closest to that of the color temperature reference used to generate the S1 scene prototype reference is chosen.

The sensor independent scene prototype image is then transformed into a scene prototype image for imaging sensor S2 based on the selected S2 color temperature reference. For the transformation, first white balance gains R_gain', G_gain', and B_gain' are computed for the selected S2 color temperature reference, denoted as T2. The white balance gains may be computed as $$R\_gain' = G_{t2}/R_{t2}$$

$$G\_gain' = 1.0$$

$$B\_gain' = G_{t2}/B_{t2}$$

where $R_{t2}$, $G_{t2}$, and $B_{t2}$ are the R, G, B values for the selected S2 color temperature reference T2.

The sensor independent scene prototype image is then transformed into a scene prototype image for imaging sensor S2 by computing R, G, B values for the pixels in the S2 scene prototype image based on the white balance gains computed for the selected S2 color temperature reference. More specifically, the R, G, B values of the pixels of the S2 scene prototype image, denoted as Y, may be computed as $Ry = Rz/R\_gain'$ $Gy = Gz/G\_gain'$ $By = Bz/B\_gain'$ where Ry, Gy, and By are the R, G, B values of the pixels of the S2 scene prototype image Y and Rz, Gz, and Bz are the R, G, B values of the pixels of sensor independent scene prototype image Z.

A scene prototype reference for sensor S2 is then generated using the transformed scene prototype image, i.e., the S2 scene prototype image. This scene prototype reference may be generated as described in reference to FIG. 6B.

The scene prototype reference is then added to the references for imaging sensor S2 (810) and the references are output as AWB configuration data for AWB in the digital system (812).

In one or more embodiments of the invention, the resulting reference set may be tested and fine tuned prior to outputting the references for use in the digital system. For example, the reference set may be tested in an AWB simulation system using test suites of images captured with the S2 sensor. If a consistent color shift is observed in images with scenes similar to scene of the image used to generate the scene prototype reference, this may indicate that the S2 color temperature reference selected for generating this scene prototype reference is not the best match for the scene prototype image. In such a case, the scene prototype reference is regenerated according to the process described above based on another S2 color temperature reference. For example, if the images appear bluish, then an S2 color temperature reference with the next higher color temperature may be selected for regeneration of the scene prototype. If the images appear reddish, then an S2 color temperature reference with the next lower color temperature may be selected for regeneration of the scene prototype. The testing and fine tuning is continued until the best S2 color temperature reference for generation of the scene prototype reference is found.

Figure 9:
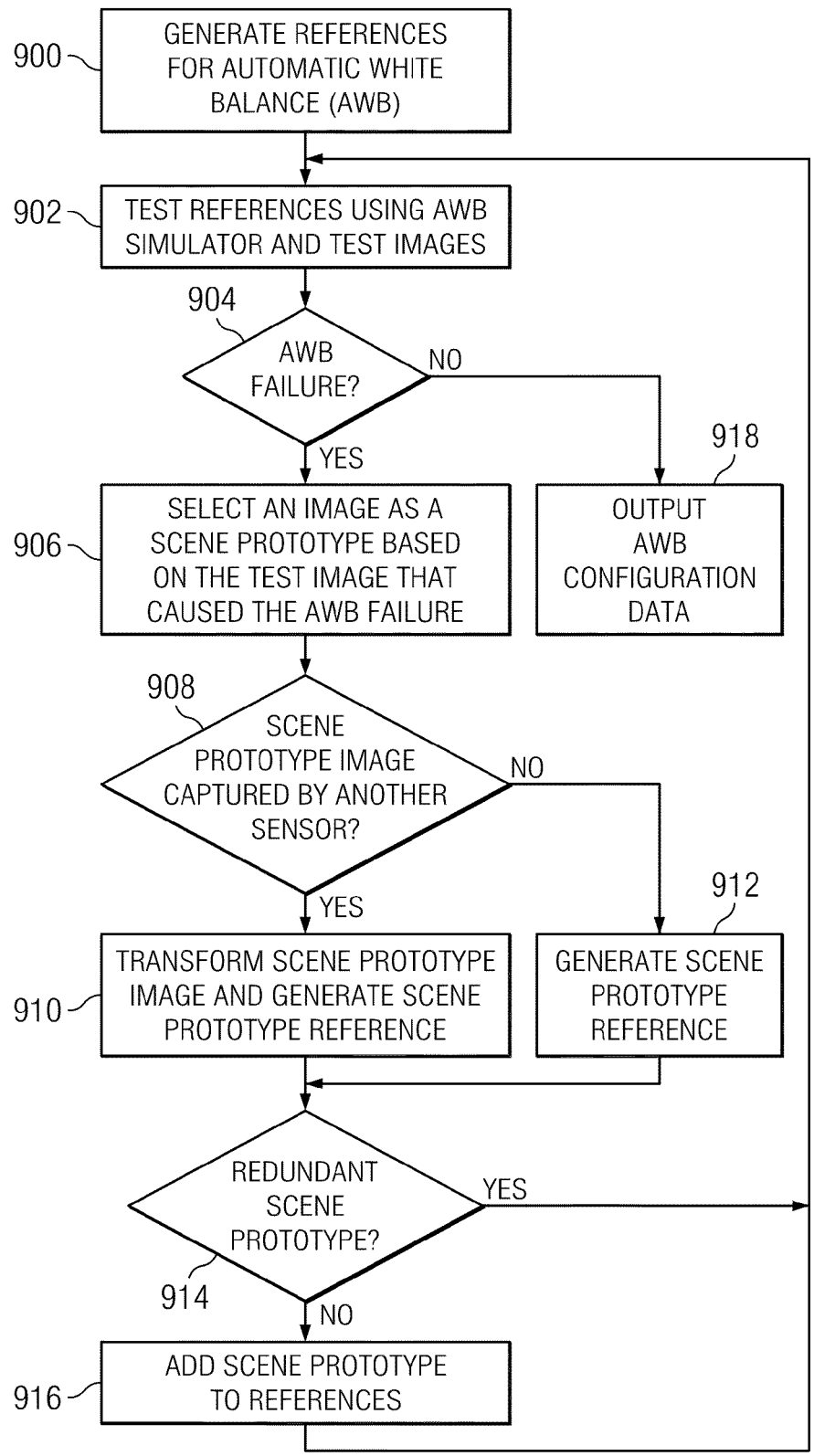

FIG. 9 is a flow graph of a method for calibration of automatic white balancing (AWB) in a digital system in accordance with one or more embodiments of the invention. Initially, color temperature references are generated for calibration of AWB in the digital system (900). The color temperature references are then tested using an AWB simulator and test images (902). If an AWB failure is detected on a test image (904), the color temperature references may be augmented with a scene prototype reference to handle the failure (904). To create the scene prototype reference, an image is selected as a scene prototype based on the test image that caused the AWB failure (906). If the selected scene prototype image was captured an imaging sensor other than the one used in the digital system (908), that scene prototype image may be transformed into a scene prototype image for the imaging sensor used in the digital system and a scene prototype reference generated as described above in reference to FIG. 8 (910). Alternatively, a scene prototype reference may be generated from the selected image as described above in reference to FIG. 5 (912).

After the scene prototype reference is generated (either 910 or 912), a check is made to determine if the scene prototype reference is redundant, i.e., that a scene prototype reference already in the references is too similar to the generated scene prototype reference (914). If the generated scene prototype reference is determined to be redundant, it is not added to the references. Otherwise, the generated scene prototype reference is added to the references (916). Testing and generation of scene prototypes references (902-914) continues until no AWB failures are found (904). When no AWB failure is detected, the references are output as AWB configuration data for AWB in the digital system (918).

Embodiments of the methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized programmable accelerators. A stored program in an onboard or external (flash EEP) ROM or FRAM may be used to implement the video signal processing including embodiments of the methods for image noise filtering described herein. Analog-to-digital converters and digital-to-analog converters provide coupling to the real world, modulators and demodulators (plus antennas for air interfaces) can provide coupling for transmission waveforms, and packetizers can provide formats for transmission over networks such as the Internet.

Embodiments of the methods described herein may be implemented in hardware, software, firmware, or any combination thereof. If implemented at least partially in software, the software may be executed in one or more processors, such as a microprocessor, application specific integrated circuit (ASIC), field programmable gate array (FPGA), or digital signal processor (DSP). The software embodying the methods may be initially stored in a computer-readable medium (e.g., memory, flash memory, a DVD, USB key, etc.) and loaded and executed by a processor. Further, the computer-readable medium may be accessed over a network or other communication path for downloading the software. In some cases, the software may also be provided in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Figure 10:
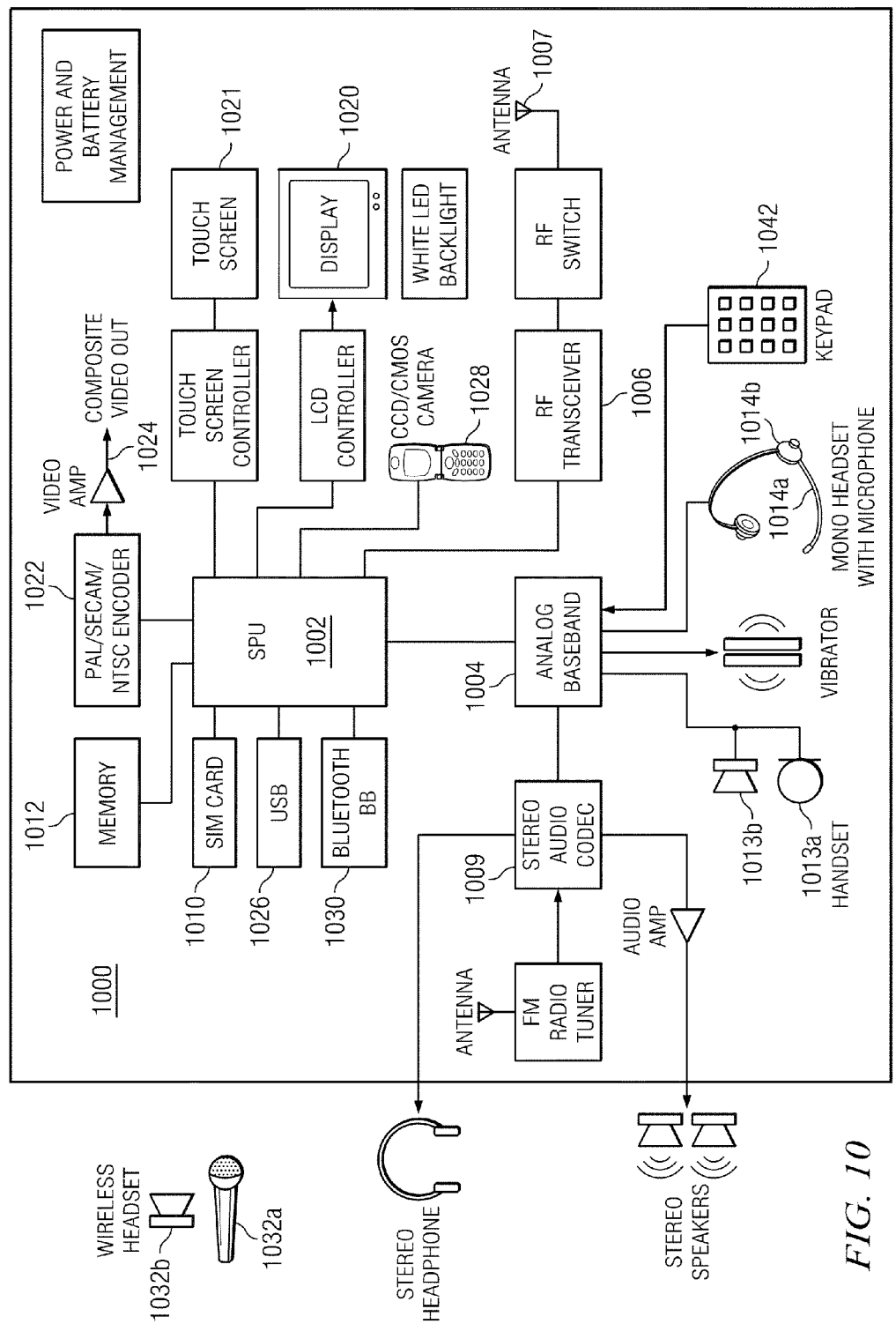
FIGS. 10 and 11 show block diagrams of digital systems in accordance with one or more embodiments of the invention.
Figure 11:
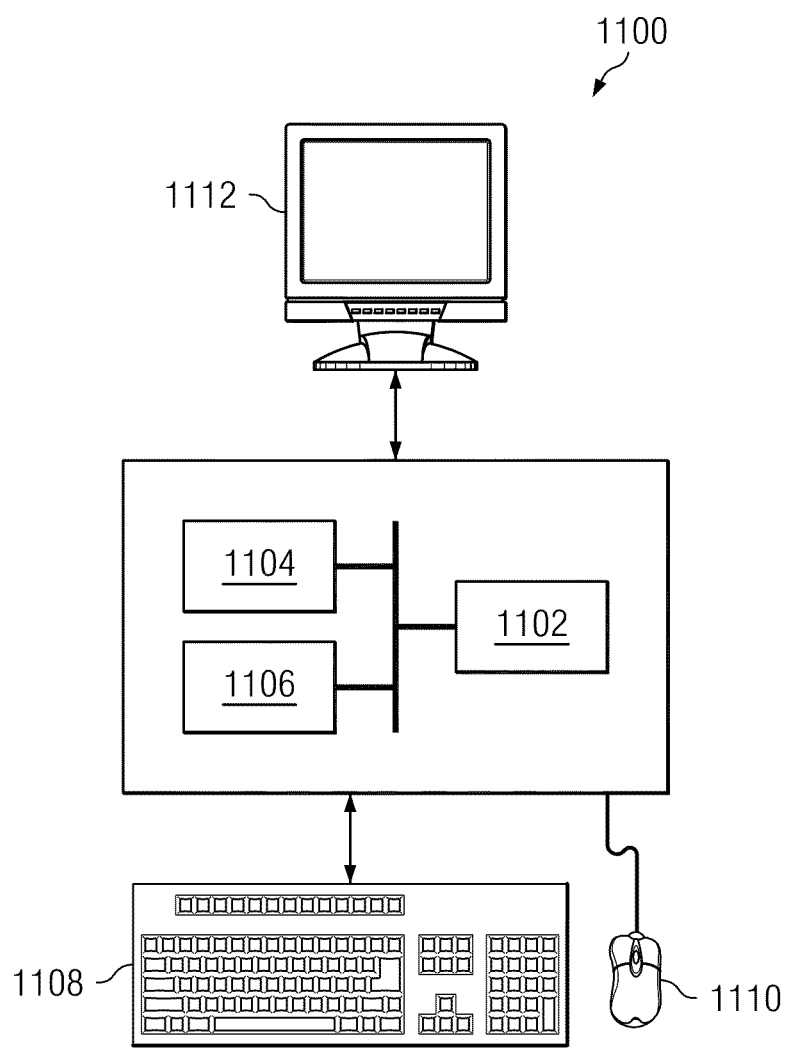

Embodiments of the AWB methods as described herein may be implemented for virtually any type of digital system (e.g., a desk top computer, a laptop computer, a handheld device such as a mobile (i.e., cellular) phone, a personal digital assistant, a digital camera, etc.) with functionality to capture digital image data using an imaging sensor. FIGS. 10 and 11 show block diagrams of illustrative digital systems.

FIG. 10 is a block diagram of a digital system (e.g., a mobile cellular telephone) (1000) that may be configured to perform the methods described herein. The signal processing unit (SPU) (1002) includes a digital signal processor system (DSP) that includes embedded memory and security features. The analog baseband unit (1004) receives a voice data stream from handset microphone (1013a) and sends a voice data stream to the handset mono speaker (1013b). The analog baseband unit (1004) also receives a voice data stream from the microphone (1014a) and sends a voice data stream to the mono headset (1014b). The analog baseband unit (1004) and the SPU (1002) may be separate integrated circuits. In many embodiments, the analog baseband unit (1004) does not embed a programmable processor core, but performs processing based on configuration of audio paths, filters, gains, etc. being setup by software running on the SPU (1002). In some embodiments, the analog baseband processing is performed on the same processor and can send information to it for interaction with a user of the digital system (1000) during a call processing or other processing.

The display (1020) may also display pictures and video streams received from the network, from a local camera (1028), or from other sources such as the USB (1026) or the memory (1012). The SPU (1002) may also send a video stream to the display (1020) that is received from various sources such as the cellular network via the RF transceiver (1006) or the camera (1026). The SPU (1002) may also send a video stream to an external video display unit via the encoder (1022) over a composite output terminal (1024). The encoder unit (1022) may provide encoding according to PAL/SECAM/NTSC video standards.

The SPU (1002) includes functionality to perform the computational operations required for video encoding and decoding. The video encoding standards supported may include, for example, one or more of the JPEG standards, the MPEG standards, and the H.26x standards. In one or more embodiments of the invention, the SPU (1002) is configured to perform the computational operations of an AWB method as described herein. Software instructions implementing the method may be stored in the memory (1012) and executed by the SPU (1002) as part of capturing digital image data, e.g., pictures and video streams.

FIG. 11 shows a digital system (1100) (e.g., a personal computer) that includes a processor (1102), associated memory (1104), a storage device (1106), and numerous other elements and functionalities typical of digital systems (not shown). In one or more embodiments of the invention, a digital system may include multiple processors and/or one or more of the processors may be digital signal processors. The digital system (1100) may also include input means, such as a keyboard (1108) and a mouse (1110) (or other cursor control device), and output means, such as a monitor (1112) (or other display device). The digital system (1100) may also include an image capture device (not shown) that includes circuitry (e.g., optics, a sensor, readout electronics) for capturing still images and/or video sequences. The digital system (1100) may include functionality to perform embodiments of the methods as described herein. The digital system (1100) may be connected to a network (e.g., a local area network (LAN), a wide area network (WAN) such as the Internet, a cellular network, any other similar type of network and/or any combination thereof) via a network interface connection (not shown). Those skilled in the art will appreciate that these input and output means may take other forms.

Further, those skilled in the art will appreciate that one or more elements of the aforementioned digital system (1100) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform embodiments of the invention may be stored on a computer readable medium such as a compact disc (CD), a diskette, a tape, a file, memory, or any other computer readable storage device. The software instructions may be distributed to the digital system (1100) via removable computer readable media (e.g., floppy disk, optical disk, flash memory, USB key), via a transmission path from computer readable media on another digital system, etc.

While the invention has been described with respect to a limited number of embodiments, those skilled in the art, having benefit of this disclosure, will appreciate that other embodiments can be devised which do not depart from the scope of the invention as disclosed herein. For example, instead of using a scene prototype reference as a separate reference, the histogram of the scene prototype reference may be added to the histogram of the color temperature reference that provided the best white balance correction of the scene prototype image and the resulting histogram normalized to maintain the same area. The modified reference may then replace the color temperature reference in the reference set. In another example, the height of the peaks in the histogram of the color temperature reference that provided the best white balance correction of the scene prototype image may be adjusted to reflect the probability of certain colors appearing in the scene prototype image. Accordingly, the scope of the invention should be limited only by the attached claims. It is therefore contemplated that the appended claims will cover any such modifications of the embodiments as fall within the true scope and spirit of the invention.

What is claimed is:

1. A method for calibrating automatic white balance (AWB) in a digital system comprising a first imaging sensor, the method comprising:

selecting an image as a scene prototype, wherein the selected image is representative of a class of images that resemble an image for which AWB failure was detected and wherein the selected image was captured by a second imaging sensor different from the first imaging sensor;

transforming the selected scene prototype image into a scene prototype image for the first imaging sensor, wherein transforming the selected scene prototype reference comprises:

computing second white balance gains R_gain, G_gain, B_gain based on a color temperature reference generated for the second imaging sensor that provides white balance correction for the selected scene prototype image converting the selected scene prototype image to a sensor independent scene prototype image by computing R, G, B values of pixels in the sensor independent scene prototype image based on R, G, B values of pixels in the selected scene prototype image and the second white balance gains R_gain, G_gain, B_gain;

computing first white balance gains R_gain, G_gain, B_gain based on a color temperature reference in the color temperature references that provides white balance correction for the selected scene prototype image; and converting the sensor independent scene prototype image into the scene prototype image for the first imaging sensor by computing R, G, B values for pixels of the scene prototype image for the first imaging sensor using the first white balance gains and the R, G, B values of the pixels of the sensor independent scene prototype image;

generating a scene prototype reference using the scene prototype image for the first imaging sensor; and adding the generated scene prototype reference to references for AWB, wherein the references comprise color temperature references.

2. The method of claim 1, further comprising outputting AWB configuration data for the digital system, wherein the AWB configuration data comprises the color temperature references and the second scene prototype reference.

3. The method of claim 1, wherein adding the generated scene prototype reference comprises:
   determining whether a scene prototype reference in the references renders the generated scene prototype reference redundant; and
   adding the generated scene prototype reference to the references when the generated scene prototype reference is not redundant.

4. The method of claim 3, wherein determining whether a scene prototype reference in the references renders the generated scene prototype reference redundant comprises:
   computing a correlation score between the generated scene prototype reference and a scene prototype reference in the references; and
   determining that the generated scene prototype reference is not rendered redundant by the scene prototype reference based on the correlation score and a correlation threshold.

5. The method of claim 1, wherein generating a scene prototype reference comprises
   generating a histogram of the scene prototype image for the first imaging sensor;
   transforming the histogram to a canonical form; and
   determining gray values for the scene prototype reference.

* * * * *